Aug. 11, 1953
R. D. SHAPTER
2,648,142
CLOTHES DRIER
Filed Aug. 16, 1947
5 Sheets-Sheet 1
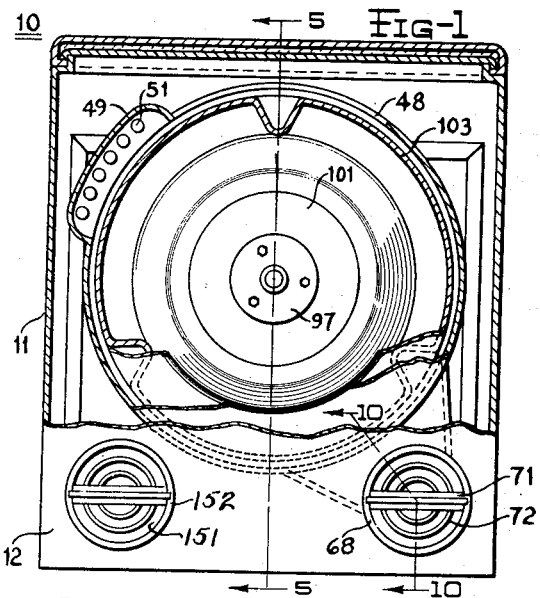
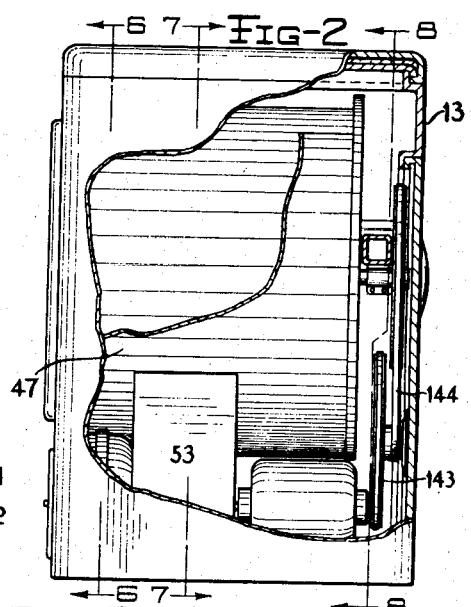
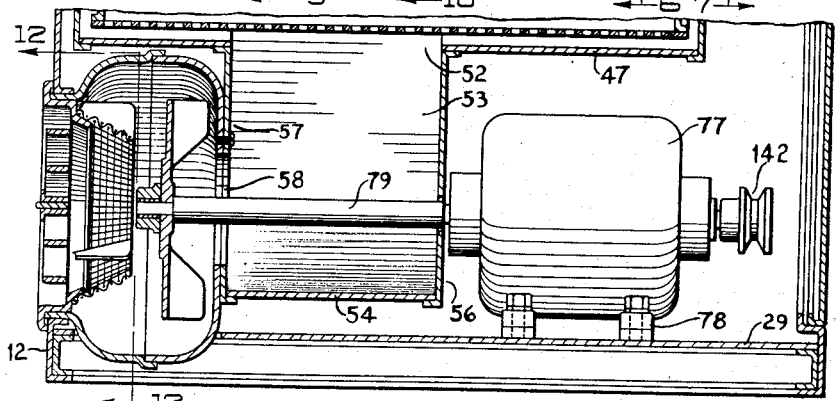
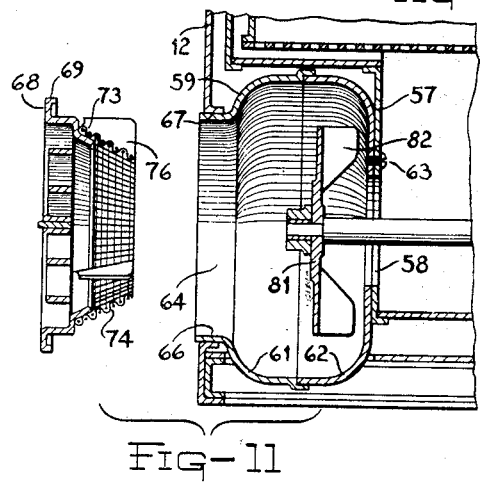
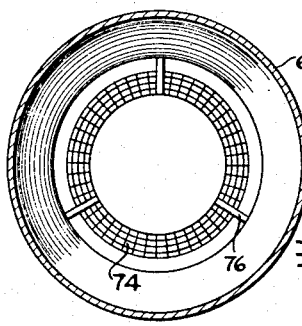
Inventor
Robert D. Shapter
By Richmond J. Hayes
Attorney Aug. 11, 1953    R. D. SHAPTER    2,648,142
CLOTHES DRIER
Filed Aug. 16, 1947    5 Sheets-Sheet 2
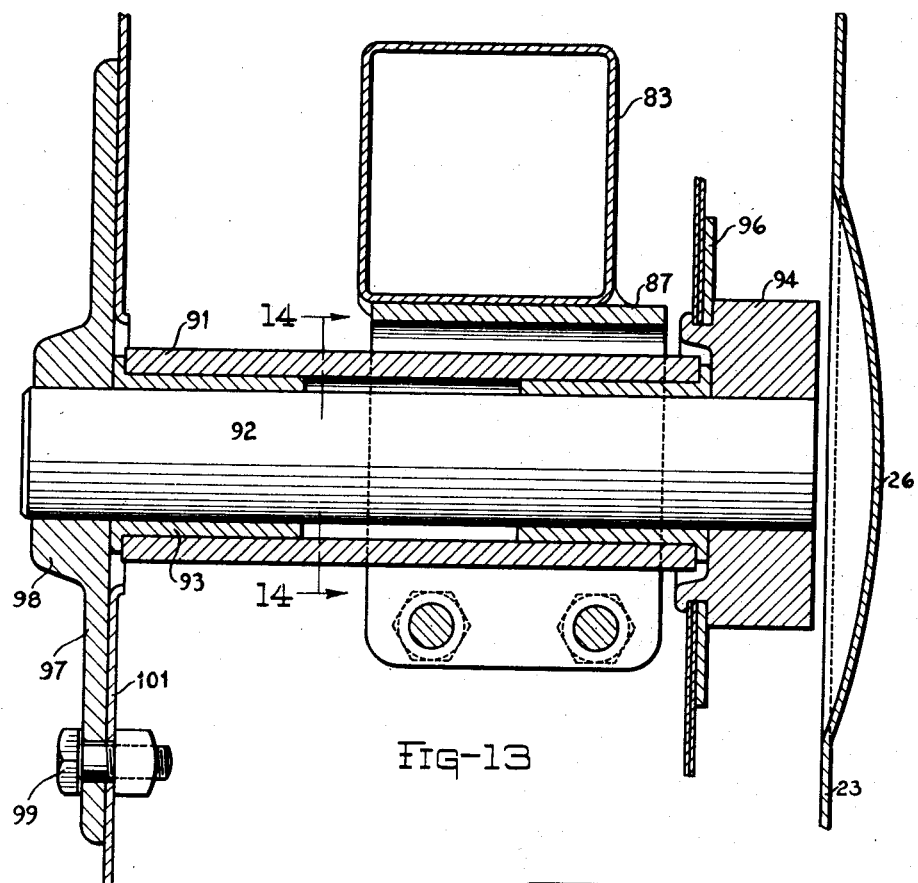
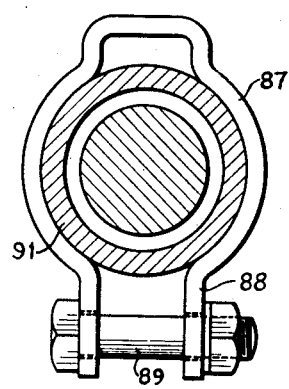
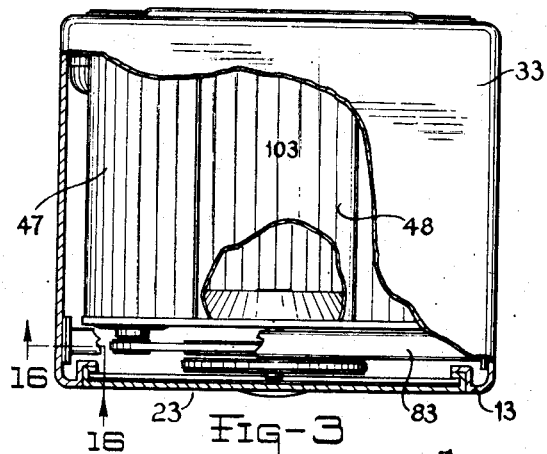
Inventor.
Robert D. Shapter
By Richmond S. Hayes
Attorney.

Aug. 11, 1953 — R. D. SHAPTER — 2,648,142
CLOTHES DRIER
Filed Aug. 16, 1947 — 5 Sheets-Sheet 3
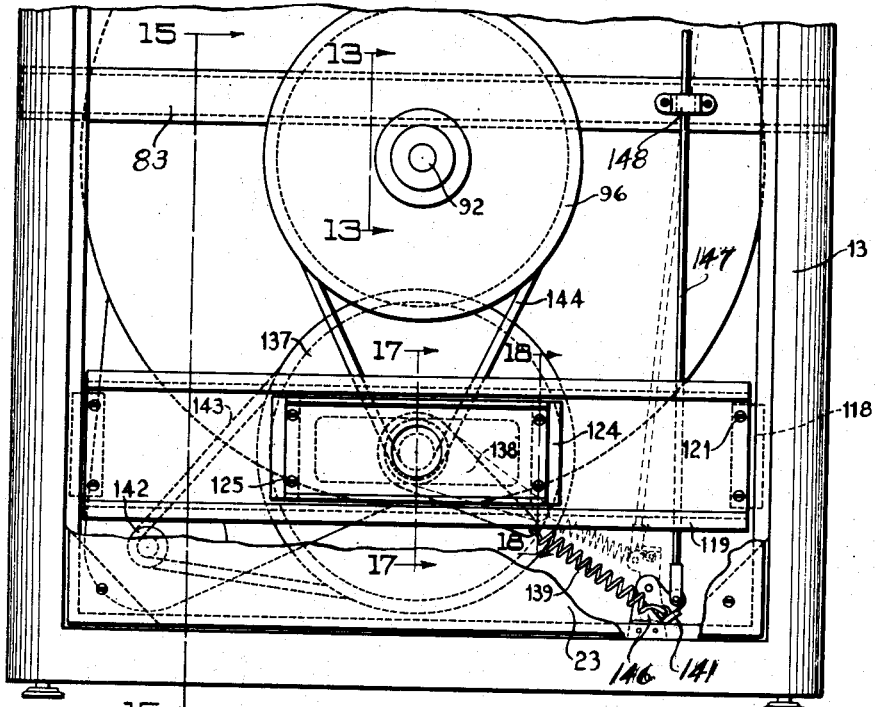
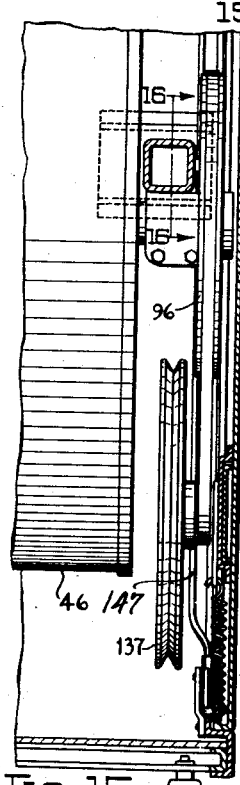
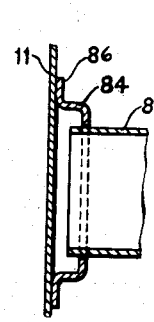
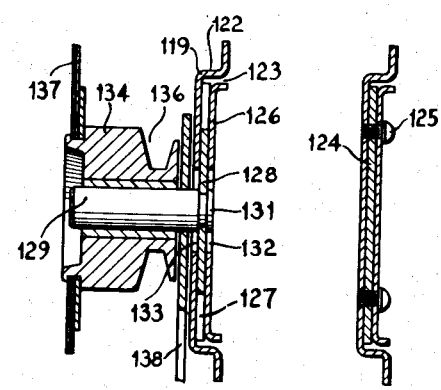
Inventor.
Robert D. Shapter
By Richmond A. Hayes
Attorney.

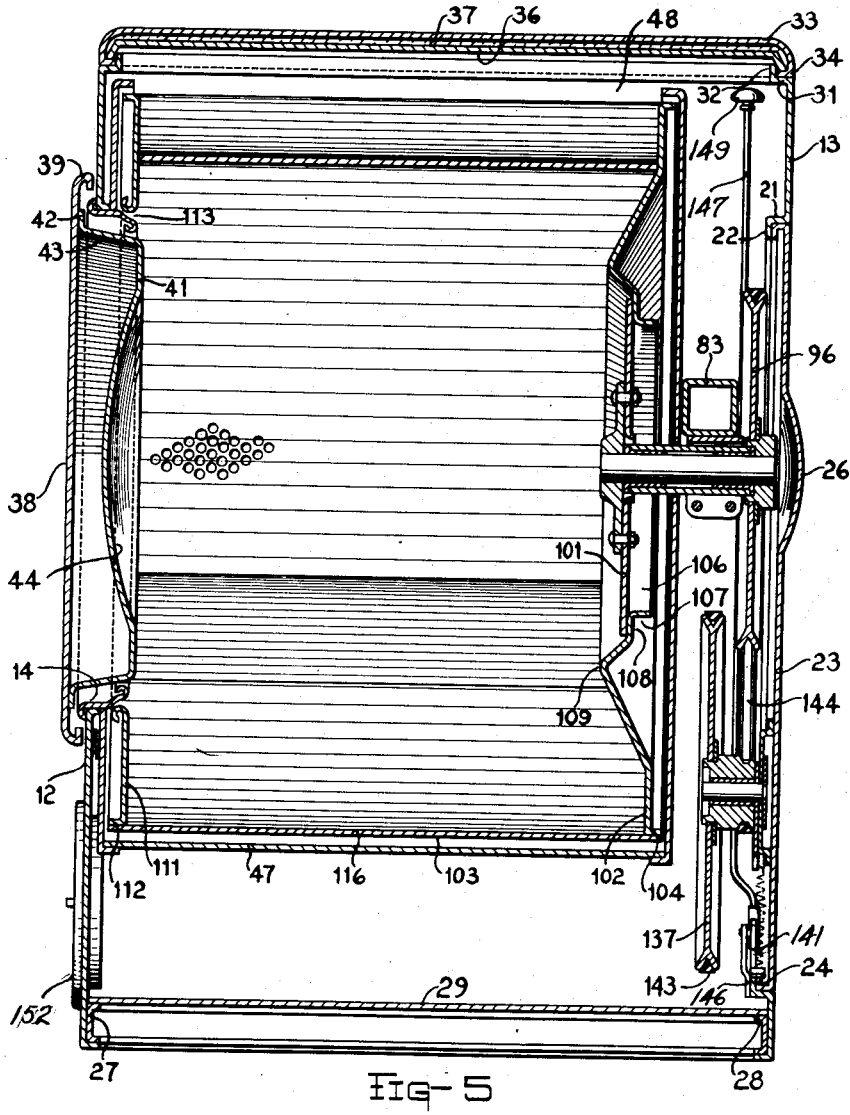

Aug. 11, 1953  R. D. SHAPTER  2,648,142
CLOTHES DRIER
Filed Aug. 16, 1947  5 Sheets-Sheet 5

Inventor
Robert D. Shapter
By
Richmond A. Hayes
Attorney

Patented Aug. 11, 1953

2,648,142

UNITED STATES PATENT OFFICE 2,648,142

CLOTHES DRIER

Robert D. Shapter, Corry, Pa., assignor, by mesne assignments, to The Murray Corporation of America, a corporation of Delaware Application August 16, 1947, Serial No. 768,987

9 Claims. (Cl. 34—82)

This invention relates to improvements in domestic clothes driers of the type in which drying is accomplished by tumbling clothes in a rotating drum in the presence of heat.

More particularly the invention is directed to a clothes drier having a cabinet of an attractive design that encloses and conceals all of the structural and operative parts. Access to the clothes carrying drum is had through a door in the front of the cabinet, the cabinet opening registering with openings in the drum and housing therefor. The housing is constructed to provide for circulation of air through the many apertures in the circumferential wall of the drum. Motive means, mounted in the cabinet, serves to rotate the drum and actuate an air circulating device. A heating unit is set into the housing in such manner as to be capable of projecting heat into the drum interior through its apertures.

It is a principal object of the invention to provide a domestic type clothes drier that will be capable of removing a desired moisture content from wet clothing in a comparatively short space of time and through the operation of a minimum number of parts.

It is also an important object of the invention to provide, within a cabinet drier, a housing that not only serves to enclose a rotatable drum but is also provided with an air inlet aperture and outlet duct. In this connection, it is an object of the invention to provide means for collecting dust and lint particles that may have been separated from the tumbling clothes during a drying operation.

It is a further object of the invention to provide a closed cabinet that serves as the entire support for all of the structural and operative parts, including a single mount for the rotatable drum.

Another and important object of the invention lies in the provision of an air circulator which is actuated by the same motive means that serves to rotate the drum.

Additionally, it is an important object of the invention to provide a closed drier of such construction as to enable economical manufacture and ready assembly, such construction providing complete accessibility to all the operative parts, not only to enable installation but for the general maintenance and occasional removal and replacement of parts thereof.

Other objects and advantages will be more fully understood and appreciated from a consideration of the following specification taken in conjunction with the accompanying drawings; and in which Figure 1 is a front view of a clothes drier embodying one form of the invention, parts of the front cabinet wall, housing and drum being broken away to disclose certain structural relationships;

Figure 2 is a side elevational view of a clothes drier embodying the invention, parts of the cabinet side wall and housing being broken away to additionally show the relationship of certain of the parts;

Figure 3 is a top plan view of a clothes drier embodying the invention, parts of the cabinet top and drum being broken away to show additional part relationships;

Figure 4 is an enlarged rear elevational view with a part of the access panel broken away to disclose the reduction drive between the motor and drum;

Figure 5 is an enlarged vertical sectional view through the entire structure, taken substantially on the line 5—5 of Figure 1;

Figure 10 is an enlarged fragmentary vertical sectional view showing the housing exhaust duct, air circulator and lint collector, taken substantially as suggested by the line 10—10 of Figure 1;

Figure 11 is a fragmentary vertical sectional view of a part of the structure shown in Figure 10 and indicates the removability of a filter to give access to cleaning the dust collector.

Figure 12 is a vertical sectional view taken substantially as indicated by the line 12—12 of Figure 10;

Figure 13 is a greatly enlarged fragmentary vertical sectional view of the drum mount, taken substantially on the line 13—13 of Figure 4;

Figure 14 is a transverse vertical sectional view taken substantially on the line 14—14 of Figure 13;

Figure 15 is an enlarged fragmentary vertical sectional view of a part of the drum reduction drive, taken substantially on the line 15—15 of Figure 4;

Figure 16 is an enlarged fragmentary vertical sectional view of a part of the structural support for the drum mount, taken as suggested by the line 16—16 of Figure 3;

Figure 17 is an enlarged fragmentary vertical sectional view, taken substantially on the line 17—17 of Figure 4; and Figure 18 is an enlarged fragmentary vertical sectional view taken substantially on the line 18—18 of Figure 4.

Figure 9:
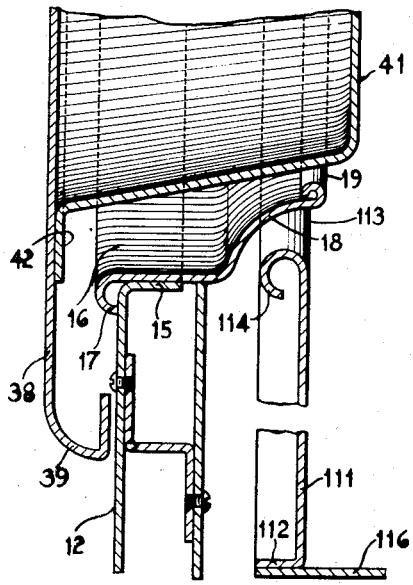
Figure 9 is a greatly enlarged fragmentary vertical sectional view showing the relationship of the drum and housing access openings and the cabinet door, taken substantially on the line 9—9 of Figure 6.
Figure 6:
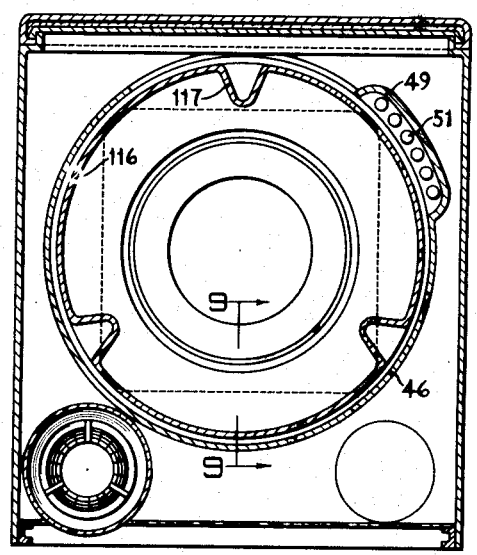
Figure 6 is a vertical transverse sectional view taken substantially on the line 6—6 of Figure 2.
Figure 7:
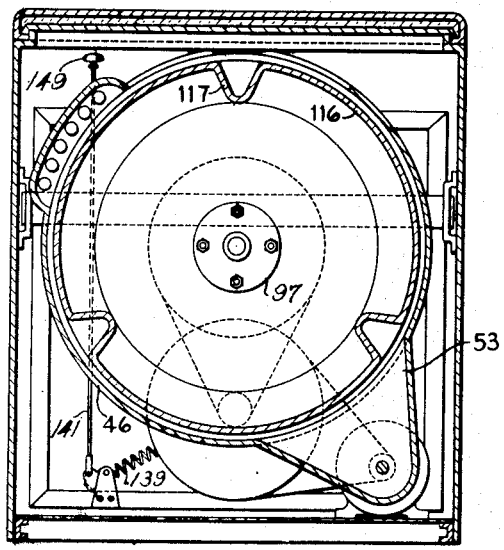
Figure 7 is a vertical transverse sectional view looking toward the rear, taken substantially on the line 7—7 of Figure 2.
Figure 8:
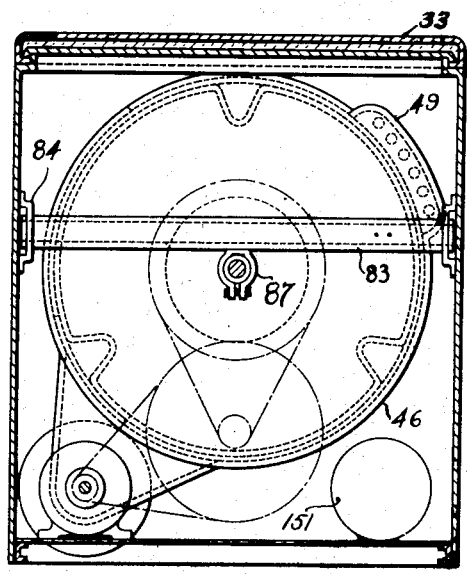
Figure 8 is a vertical transverse sectional view taken adjacent the rear of the cabinet, looking toward the front, substantially as indicated by the line 8—8 of Figure 2.

Referring more particularly to the drawing, the reference numeral 10 is employed to generally designate a device or structure in which one form of the invention is embodied. The device includes a cabinet having integral or permanently joined side walls 11, front wall 12 and rear wall 13. The side walls, preferably, are solid, unbroken panels. The front wall 12, however (see Figures 5 and 9), is formed with a circular, centrally located aperture 14 that is defined by an inturned flange 15. Attached to the inner face of this flange is a collar 16, having a rolled edge 17 that abuts the face of the wall 12 adjacent the opening 14. This collar projects inwardly of the cabinet and has a curved wall, annular flange 18 that terminates in a rolled edge or bead 19. The rear wall 13 is formed with a rather large rectangular opening, all four edges of which are defined by substantially identical inturned flanges 21 that terminate in further flanges 22. The flanges 22 serve as a stop to locate a removable panel 23 flush with the wall 13. The panel 23 may be formed on its four edges with flanges 24 that seat against the flanges 21 and 22 of the rear wall. This panel may include a rearwardly curved center portion 26 to clear certain of the interior operative parts. Adjacent the lower edges of the front, side and rear walls, the cabinet is reinforced with channel members 27. The upper flange or side 28 of each of these members constitutes a ledge or seat for a base panel 29. Although no intermediate or cross panels or braces are shown, it will be understood that one or more such members may be provided, as found necessary, to sustain the weight of parts that may be located on the base panel 29. The top edges of the front, side and rear walls are formed with inwardly set horizontal flanges 31 that terminate in upstanding flanges or shoulders 32. A top or cover 33 is adapted to be mounted on the seat formed by the flanges 31, and this top therefore includes a depending flanged edge 34 which is proportioned to bring the edges of the cover flush with the upright walls of the cabinet. As will later be brought out, the upper portion of a housing within the cabinet is open and it is therefore found suitable to provide an inner cover or wall 36 adapted to support heat insulating material 37.

The access aperture 14 in the front wall 12 may be closed by a door that, in the present disclosure, comprises an outer rectangular panel 38. One vertical edge of this panel is provided with a suitable hinge such, for instance, as a piano hinge which in turn is secured to wall 12 in any conventional manner. The edges of this panel may be rolled to provide a finished margin, as indicated at 39. The door includes an inner circular panel 41 which is spacedly joined to the inner face of panel 38 along the flanges 42 of an annular rim 43. Centrally the panel 41 may be slightly dished or curved toward panel 38, as suggested by the numeral 44. It will be noted that panel 41 extends inwardly of the cabinet beyond the vertical plane of the bead 19 which, as already brought out, frames the inner portion of the access opening 14. The rim 43 is of such proportions as to closely approach the bead 19 when the door is in closed position.

Within the cabinet described is located a housing 46 of generally drum-like proportions. The circumferential wall 47, adjacent the top of the cabinet, is cut away to provide a top opening 48 which gives access as between the space within the cabinet and the interior of the housing. Adjacent the opening 48, the wall 47 may be offset in a generally radial direction, as suggested at 49, to provide accommodation for an electric heating unit 51. The wall 47, adjacent the bottom and to one side of the cabinet, is formed with an opening 52. Attached to the walls forming this opening is an exhaust duct 53. This duct from the opening 52 has converging side walls and is closed as indicated by the wall 54 at its bottom. Wall 56 closes the rear of this duct. The front wall 57 is apertured, as at 58. Located in the space between the front cabinet wall 12 and the exhaust duct wall 57 is a structure that, in operation, serves as an air circulator for the drum, a separator of air and lint, and lint collector. This structure is mounted in a housing 59 that, in the present disclosure, includes split circular parts 61 and 62. The part 62 is fixed to the outer face of wall 57 and has an opening 64 that registers with the opening 58. Any suitable means, such as the screws 63, may join the edges of parts 62 to wall 57, substantially as suggested in Figure 11. The front portion of 61 of the housing 59 includes an opening 64 that is defined by an annular rim 66. Although not heretofore mentioned, the front wall 12 of the cabinet is formed with a circular opening 67 and the rim 66 is adapted to project through this opening. A grill member 68 is adapted to be engaged with the rim 66. This member includes an annular rim 69 of such proportions as to conceal the rim 66 and provide a finished appearance to the exterior or front of the cabinet. Any suitable ornamental cross and circular members, such as parts 71 and 72, may be provided, the only requirement being that such ornamentation be of insufficient proportions to seriously hinder the flow of air through the grill member. To the rear of the rim 69, an annular, inwardly inclined flange 73 mounts an annular screen 74. Attached to the screen or flange 73, or both, are a series of radially, outwardly extending wings 76. The combined depth of the grill member 68 and screen 74 is slightly less than the depth of part 61 of the housing 59. A comparison of Figures 10 and 11 indicates that, following operation of the device, the grill member may be removed and lint, previously collected in the housing 59, readily removed. Following this cleaning operation, the grill member may again readily be set into place.

An electric motor 77, having a suitable base 78, is mounted on the base panel 29 substantially as suggested in the drawing. This motor is located in close proximity with the rear wall 56 of the exhaust duct and includes a shaft 79 that projects through an opening in the rear wall 56 and opening 58 into part 62 of the housing 59. Secured to the end of this shaft is a multiple bladed rotor, one form consisting of a circular disk 81, from one face of which a number of radially directed, perpendicular blades 82 extend. When the motor is operated, the rotor serves to withdraw air from the interior of the housing 46 into duct 53, through opening 58 into the housing 59. When the withdrawn air reaches the housing 59, it is caused to flow in a circular path and any particles heavier than air will be thrown into contact with the circumferential wall of the housing and come to rest or be pocketed by the screen 74 and part 61 of the housing.

Adjacent the rear of the cabinet is located a tubular cross support 83. This support extends transversely of the cabinet and its ends project into suitable apertures in brackets 84. The marginal flanges 86 of each of these brackets are welded or otherwise permanently joined to the side walls 11. Centrally the support 83 is provided with a fixed, depending, clamp-type bracket 87. This bracket, as may be seen in Figure 14, is closed at the top and includes free ends 88, through which bolts 89 may project for the purpose of drawing these ends into engagement with a bearing sleeve 91. This sleeve serves to support a shaft 92 and, as may be seen in Figure 13, is fitted with internal bearing collars 93, one being located adjacent each end of the sleeve. These collars or bearings serve to mount the shaft 92. One end of this shaft, projecting beyond the sleeve, mounts the hub 94 of a V-belt pulley 96. The other end of the shaft mounts a circular plate 97, having a hub 98 of such proportions as to provide an ample area of contact with the shaft 92. Joined to the plate 97 in any suitable manner, as by bolts 99, is a disk 101. This disk is of considerably greater diameter than that of the plate and is adapted to be permanently joined in any suitable manner, as by welding, to the rear wall 102 of a drum 103. The circumferential edge of wall 102 is formed with a flange 104. Centrally the wall is apertured, as at 106, and this aperture is defined by a flange 107. A ledge 108, adjacent the flange 107, provides a seat for the periphery of the disk 101 and throughout this portion of overlap of disk and ledge, permanent securing means is provided. From the ledge 108 there is an inwardly curved circular rib 109. The particular contour of the rear wall 102 is intended to provide such rigidity as to enable supporting the remaining portions of the drum, substantially as shown. The front wall 111 of the drum includes a peripheral flange 112. A large centered opening 113 is defined by a rolled edge 114 (see Figures 5 and 9).

The circumferential wall 116 of the drum is formed from a perforated strip, the side edges of which overlie and are permanently joined to the flanges 104 and 112 of the rear and front walls. In order that the clothes intended to be dried in the device may be properly tumbled, a number of transverse, inwardly directed ribs 117 may be formed in the wall 116. These ribs may be of the same material as the wall 116, or may be unperforated, V-shaped pieces joined to the front and rear walls. In this latter instance, the circumferential wall 116 of the drum would be formed from several pieces, the number of which depending on the number of V-shaped pieces. It will be noted that the drum 103 is so proportioned as to nearly fill the drum housing 46, leaving only sufficient clearance to facilitate free rotation thereof. Also, it will be noted that the rolled edge 114, which defines the opening 113 in the front wall of the drum, closely approaches the curved flange 18 of the collar 16 which defines the access opening in the front wall of the cabinet. Examination of Figure 9 indicates that the front wall 111 of the drum, the rim of the opening 14, and the innermost panel 41 of the cabinet door are in such proximity as to prevent any articles of clothing, during a drying operation, from becoming caught, wedged or torn between these relatively moving parts of the structure. At this point, attention is directed to the fact that the drum in its entirety is supported, through its rear wall 102, disk 101, and plate 97, on the innermost end of shaft 92.

The rear panel 23, as heretofore mentioned, is removable and, when removed, exposes pulley 96 located on the rearmost part of the drum supporting shaft 92. Permanently joined to the vertical walls that define the opening intended to be closed by the panel 23, are plates 118. The edges of these plates extend somewhat into the panel receiving opening and mount the ends of a horizontally extending channel member 119, by screws 121. The top and bottom flanges 122 of this channel not only serve to rigidify this member for the support of a part of the drum reduction drive mechanism, but also to provide a recess 123. In this recess is located a pair of spaced apart plates 124 that extend transversely of the channel. A cover plate 126 is secured by screws 125 to the plates 124, and thus the base of the channel and the plate 126 provide a compartment 127. In this compartment is located a slide bar 128. Centrally this bar mounts one end of a stub shaft 129. The head end 131 of this shaft, extending beyond the bar 128, is located in a circular opening 132 in the plate 126 and, of course, the base wall of the channel is formed with an aperture 133 through which the shaft 129 projects. Mounted to rotate on shaft 129 is a hub 134, in which is formed a pulley 136 adapted to receive a V-belt. Attached to this hub is a large diametered pulley 137, which also is intended to receive a V-belt. Between the inner end of the hub 134 and the channel member 119, shaft 129 mounts one end of a strap 138. The other end of this strap is apertured to receive one end of a spring 139. The other end of this spring is attached to a toggle member 141. Operation of this member, for the purpose of changing the tension of the spring, will hereinafter be set out. A pulley 142 is mounted on the shaft of the motor 77. A V-belt 143 connects this pulley with the pulley 137 carried by the shaft 129. A further V-belt 144 connects the small hub pulley 136 with the large diametered pulley 96 mounted on one end of the drum carrying shaft 92. The reduction drive from motor pulley 142 to pulley 96 is such that the drum 103 may be caused to revolve at a comparatively low speed.

In a device of this class, wherein considerable heat is confined, it is highly desirable that the drum rotate at such speed that the clothes contained therein may not become scorched or burned as a result of passing too slowly past the heating unit 51. In the present embodiment of the invention, two belts are utilized as a part of the reduction drive mechanism, and it is essential to provide means for maintaining such tension on these belts that no slippage may occur by reason of which the speed of rotation of the drum might be slowed, or cease entirely. Attention is, therefore, directed to the toggle member 141. This member is mounted for pivotal movement on a bracket 146 (see Figure 4). The spring 139, of course, is attached to the free end of this toggle member, adjacent which is a pivotal connector for one end of a rod 147. This rod extends upwardly of the rear of the machine, being guided by a bracket 148 carried by the cross support 83. As may be seen in Figure 5 of the drawing, rod 147 terminates in a knob 149, located directly beneath the inturned flanges 31 which define the upper limits of the upright panels of the cabinet. When the toggle member 141 is in the position shown in full line (Figure 4) spring 139 is under tension and urges slide bar 128 in a direction to bring belts 143 and 144 under tension. On occasion it becomes desirable to clean the drum of lint or other particles that may have become dislodged from clothing during drying operations. This suggests the advisability of releasing the tension of the reduction drive belts for the purpose of permitting the operator to freely rotate the drum. Of course, the panel 23 can be removed and the belts disengaged from their respective pulleys, but as this panel was provided primarily for part replacement or repairs, it is deemed more convenient to merely lift off the top or cover 33, thereby exposing the knob 149. When the operator of the device lifts this knob, the toggle member 141 is swung into the dotted line position of Figure 4 and tension of the spring 139 is sufficiently relieved to allow slippage of the belts and relatively free rotation, by hand, of the drum. It will be understood, of course, that when belt replacement or other maintenance or repairs are required, panel 23 will be removed, toggle 141 swung into the dotted line position above mentioned, and belts 143 and 144 may then be removed and replaced or other work accomplished, as may be required in maintenance of the device. Of course, suitable lubricant enables free sliding movement of bar 128 between its guide plates and to an extent determined by the relative diameters of head 131 and opening 132.

For a clearer understanding of the invention, a brief description of its operation is set out as follows:

Door 38 of the cabinet is swung into opened position and a quantity of wet clothing placed in the drum. After closing the door, a suitable switch (not shown) is moved into a position to close the electrical circuit of the motor 77. A separate switch may be provided to close the circuit of the heating unit 51, or, as is conventional in devices of this nature, a suitable delayed-action switch may be associated with the motor switch for the purpose of closing the circuit of the heater. Rotation of the motor 77 causes the drum, through its reduction drive, to slowly revolve. The clothes in the drum will be thoroughly tumbled, due not only to the slow rate of rotation, but also to the provision of the cross ribs 117. The shaft 79 of the motor 77, which extends into the housing 59, mounts the circular disk 81 and blades 82. When this structure is in motion, air adjacent the blades flows outwardly into contact with and along the curved housing walls 61 and 62 in its centrifugal pattern until it contacts the wings 76. This centrifugal flow is broken by the wings, thus causing the air to pass through the screen 74 and the air exhaust grill member 68 to the exterior of the cabinet. This movement of air within the housing 59, through rotation of the blades 82, causes air to be drawn through opening 58 from the exhaust duct 53 which is in direct communication with the lower portion of the drum housing 46. As already described, the only other opening in the drum housing is the top aperture 48. An air inlet port 151, opening into the cabinet, permits continuous passage of fresh air through the cabinet and into the drum housing by way of the aperture 48. This port may be provided with a grill member 152 which, for purposes of symmetry and ornamentation, may be located as shown in Figure 1 of the drawing, and include ornamental parts such as the parts 71 and 72 of grill member 68. At such time as the clothes in the drum have become dried, the drive motor is stopped, the heater turned off, the cabinet door opened, and the clothes removed.

During the operation of drying the clothes, a certain amount of lint or other particles become loosened and are carried in the flow of air through the device into the housing 59. Although these particles follow the contour of the walls of this housing, they are blocked from leaving the cabinet through the exhaust port by the action of the wings in breaking up the centrifugal flow of the air, and the filtering screen 74. After several drum loads of clothes have been dried, it may be found necessary to withdraw the grill member 68 for the purpose of removing the accumulation of lint that has adhered to the wings and screen. Following this, the grill may be replaced and the device again used for its intended purpose. It will be particularly noted that the drum operating mechanism is of extremely simple design and involves the use of comparatively few, easily accessible, operating parts. Also, the mechanism by which air is circulated through the device and air and lint are separated is of such extremely simple construction as to render the device substantially free of operative breakdown. Furthermore, it will be apparent that all operative parts of the device are wholly accessible through the removal of the top 33 and rear panel 23 and, since the operative parts are entirely removed from any possibility of association with the drum contents, there can be no danger of soiling the clothes in the drum by their inadvertent contact or proximity with any of the operative parts.

Although applicant has shown and described only one form of his invention, it will be apparent to those skilled in the art that modifications may be made and are contemplated insofar as such modifications are within the spirit and scope of the annexed claims.

Having thus set forth my invention what I claim as new and for which I desire protection by Letters Patent is:

1. A clothes drier comprising a cabinet having a front wall access opening, a housing mounted in said cabinet, a drum in said housing mounted for rotation about a horizontal axis, the front walls of said housing and said drum having openings registering with the opening in said cabinet, a door mounted on said cabinet adapted to simultaneously close the openings in said cabinet, housing and drum, said housing having an air inlet aperture adjacent the top of said cabinet and an exhaust duct at the bottom thereof, a further housing connecting said duct with the exterior of said cabinet, a centrifugal air circulator and conical-shaped lint trap having radial vanes on the exterior in the path of circulating air mounted in said last mentioned housing, and means for simultaneously operating said air circulator and rotating said drum.

2. A clothes drier comprising a cabinet having a front wall access opening and a door adapted to close said opening, a housing mounted in said cabinet, a drum in said housing mounted for rotation about a horizontal axis, one wall of said cabinet having air inlet and outlet apertures, the top portion of said housing being apertured to give air communication with the interior of said cabinet, an air exhaust dust connected with said housing, a further housing connecting said duct with the outlet aperture, a centrifugal air circulator mounted in the last mentioned housing, a lint trap mounted within the last mentioned housing at the outlet opening therein having exteriorly projecting vanes for interrupting the flow of air and collecting the lint carried thereby, and means for simultaneously operating said air circulator and rotating said drum.

3. In a clothes drier, a cabinet, a housing mounted in said cabinet, a rotatable drum in said housing, a support extending transversely of and joined to the side walls of said cabinet, means joined to the rear wall of said drum carried by said support and constituting the sole mount for said drum, a removable panel closing an opening in the rear wall of said cabinet, a member bridging the opening in said rear wall and supported at the edges thereof, reduction drive means mounted on said member, a motor in said cabinet operatively associated with said drive means, and a belt connecting said drive means with said drum.

4. In a clothes drier having a cabinet, a housing having a rear vertical wall in said cabinet and a drum in said housing, drum mounting means comprising a reinforcement plate on the rear vertical wall thereof, a horizontal shaft secured at one end to said plate, said shaft projecting through an opening in said housing into said cabinet, a transverse support adjacent the rear of said cabinet, bearing means, carried by said support, mounting said shaft, a removable panel closing an opening in the rear wall of said cabinet, a member bridging the opening in said rear wall and secured to the edges thereof, reduction drive means mounted on said member, a motor in said cabinet operatively associated with said drive means, and a belt connecting said drive means with said drum.

5. In a clothes drier having a cabinet, a housing in said cabinet, a drum in said housing mounted for rotation for tumbling clothes therein, heating means in the cabinet, a conduit for the flow of air connected to the housing, an annular housing joined to said conduit, an air-moving element in said annular housing embodying a plate having radial vanes for propelling air through said conduit and about the inner periphery of the annular housing, a lint trap having a peripheral wall containing openings, radial vanes extending outwardly of the wall in the path of the moving air for directing it through the wall on which the lint from the air is trapped, and motor means for driving said drum and air-moving element.

6. In a clothes drier having a cabinet, a housing in said cabinet, a drum in said housing mounted for rotation for tumbling clothes therein, heating means in the cabinet, a conduit for the flow of air connected to the housing, an annular housing connected to said conduit, an air-moving element in said annular housing embodying a plate having radial vanes for propelling air through said conduit and about the inner periphery of the annular housing, a lint trap having a peripheral wall containing openings, radial vanes extending outwardly of the wall in the path of the moving air for directing it through the wall on which the lint from the air is trapped, and motor means for driving said drum and air-moving element, said peripheral wall being annular in shape and extending inwardly of the housing to provide a central air passageway through which the air may pass when the peripheral wall is clogged with lint.

7. In a clothes drier having a cabinet, a housing in said cabinet, a drum in said housing mounted for rotation for tumbling clothes therein, heating means in the cabinet, a conduit for the flow of air connected to the housing, an annular housing connected to said conduit and having an outlet opening an air-moving element in said annular housing embodying a plate having radial vanes for propelling air through said conduit and about the inner periphery of the annular housing, a lint trap in the outlet opening having a peripheral wall containing openings, radial vanes extending outwardly of the wall in the path of the moving air for directing it through the wall on which the lint from the air is trapped, and motor means for driving said drum and air-moving element, said peripheral wall being annular in shape and extending inwardly of the housing to provide a central air passageway through which the air may pass when the peripheral wall is clogged with lint, said trap being removable from the outlet opening for cleaning purposes.

8. In a clothes drier having a housing, a drum in the housing, a rotor in said drum, heating means adjacent to said housing in the path of flow of air thereinto, a conduit secured to said housing, an annular housing connected to said conduit and having an outlet opening, an air propeller within the annular housing for directing the flow of air from the first said housing and drum toward the inner peripheral wall thereof and out the outlet opening thereof, a removable lint trap in the outlet of the annular housing having a peripheral wall of annular shape made of screenlike material and having a central opening, vanes extending outwardly from said peripheral wall within the annular housing for interrupting the flow of air and directing it through the wall on which the lint is trapped, and motor means for driving the rotor and said air propeller.

9. In a clothes drier having a housing, a drum in the housing, a rotor in said drum, heating means adjacent to said housing in the path of flow of air thereinto, a conduit secured to said housing, an annular housing connected to said conduit and having an outlet opening, an air propeller within the annular housing for directing the flow of air from the first said housing and drum toward the inner peripheral wall thereof and out the outlet opening thereof, a removable lint trap in the outlet of the annular housing having a peripheral wall of annular shape made of screenlike material and having a central opening, vanes extending outwardly from said peripheral wall within the annular housing for interrupting the flow of air and directing it through the wall on which the lint is trapped, and motor means for driving the rotor and said propeller, the ends of the air propeller and vanes being spaced substantially the same distance from the inner peripheral wall of the annular housing.

ROBERT D. SHAPTER.

References Cited in the file of this patent

UNITED STATES PATENTS

| Number | Name | Date |
|---|---|---|
| 1,358,599 | White | Nov. 9, 1920 |
| 1,427,674 | Blaney | Aug. 29, 1922 |
| 1,791,574 | Pauly | Feb. 10, 1931 |
| 1,864,201 | Kegerreis et al. | June 21, 1932 |
| 2,108,084 | Strobridge | Feb. 15, 1938 |
| 2,173,603 | Dodge | Sept. 19, 1939 |
| 2,314,748 | White | Mar. 23, 1943 |
| 2,328,256 | Breckenridge | Aug. 31, 1943 |
| 2,334,025 | O'Neill | Nov. 9, 1943 |
| 2,389,433 | Hough | Nov. 20, 1945 |
| 2,398,880 | Broglie | Apr. 23, 1946 |
| 2,406,494 | Ferris | Aug. 27, 1946 |
| 2,412,078 | Breckenridge et al. | Dec. 3, 1946 |
| 2,434,886 | Pugh | Jan. 20, 1948 |
| 2,438,995 | Forney | Apr. 6, 1948 |

FOREIGN PATENTS

| Number | Country | Date |
|---|---|---|
| 626,563 | Great Britain | July 18, 1949 |